Figures 1, 2, 3, 4, 5:
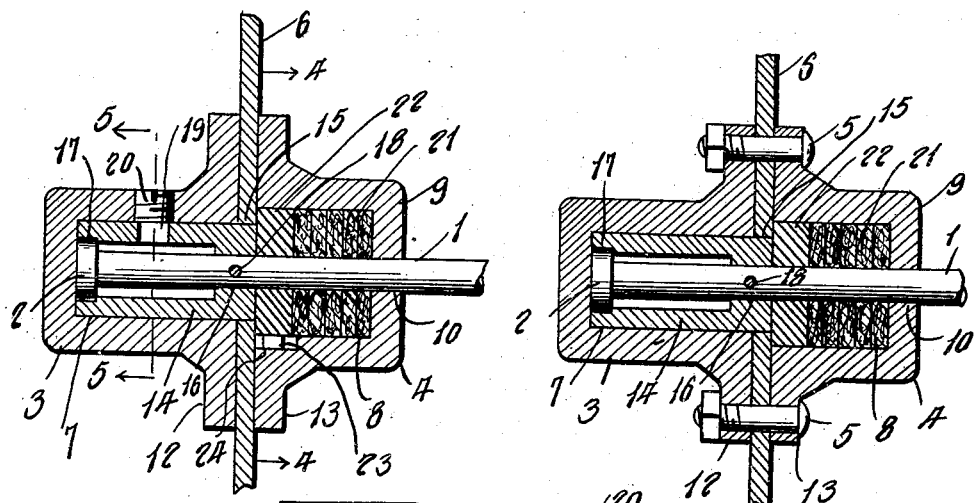

March 18, 1930. H. W. ROBBINS 1,751,291
WHEEL HUB FOR AGRICULTURAL MACHINES AND THE LIKE
Original Filed June 9, 1927

INVENTOR.
H. W. Robbins.
ATTORNEY.

Patented Mar. 18, 1930

1,751,291

UNITED STATES PATENT OFFICE

HENRY W. ROBBINS, OF HARLINGEN, TEXAS

WHEEL HUB FOR AGRICULTURAL MACHINES AND THE LIKE

Application filed June 9, 1927, Serial No. 197,587. Renewed August 8, 1929.

This invention relates to a hub for the wheels of agricultural machines, farm wagons, automobiles and the like, and has for one of its objects to provide a novel, simple and highly efficient device of this character which shall be dust-proof and provided with an axle box adapted to function as a lubricator.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is an elevational view of the hub,

Figure 2 is a sectional view taken on the plane indicated by the line 2—2 of Figure 1, Figure 3 is a sectional view taken on the plane indicated by the line 3—3 of Figure 1, Figure 4 is a sectional view taken on the plane indicated by the line 4—4 of Figure 2, and Figure 5 is a similar view taken on the plane indicated by the line 5—5 of Figure 2.

Referring in detail to the drawing, 1 designates the spindle of an axle for an agricultural machine, farm wagon, automobile or the like. The axle spindle is preferably of cylindrical formation, and is provided at its outer end with a cylindrical head 2 which may be secured thereto in any suitable manner.

The hub is of sectional formation, and the outer section 3 and inner section 4 thereof are secured together by bolts 5. The hub band 6 which may be of the construction shown or of any other suitable construction, is positioned between the hub sections 3 and 4 and is retained in place by the bolts 5. The hub section 3 is provided with a cylindrical bore 7 which is considerably larger diametrically than the axle spindle 1, and it is fully closed at its outer end and fully open at its inner end. The hub section 4 is provided with a cylindrical bore 8 which is larger diametrically than the bore 7. The hub section 4 is fully open at its outer end, and the inner closed end 9 thereof is provided with an opening 10 for the reception of the axle spindle 1. The proximate ends of the hub sections 3 and 4 are provided with flanges 12 and 13 for the reception of the bolts 5.

The axle box 14 is of cylindrical formation, and has a snug fit in the bore 7 of the hub section 3. The axle box 14 is slightly longer than the corresponding dimension of the bore 7, and the inner projecting end portion thereof is received by an opening 15 in the hub band 6. The axle box 14 is hollow, and is fully open at its outer end. The inner closed end of the axle box 14 is provided with an opening 16 for the reception of the axle spindle 1, and the outer end thereof is provided with an annular inner recess 17 for the reception of the head 2. A pin 18 passing through the inner end of the axle box 14 and through the axle spindle 1, together with the head 2, secures the axle box against rotation and endwise movement with respect to the axle spindle. The axle box 14 is provided with a radial opening 19 to permit it to be supplied with lubricant and to permit the lubricant to flow therefrom to all moving parts of the hub. The hub section 3 is provided with an opening which is closed by a removable plug 20 and which when in registration with the opening 19 permits the axle box 14 to be supplied with lubricant without removing the wheel from the axle spindle.

Packing 21 is arranged within the bore 8 of the hub section 4, and functions to prevent the lubricant from escaping by way of the opening 10 in this hub section. The packing 21 is held in place and out of contact with the inner end of the axle box 14 by a disk 22 which is positioned in the bore 8 and contacts with said end of the axle box. The disk 22 is loose on the axle spindle 1, and is caused to rotate with the hub by a lug 23 projecting from its periphery and entering a recess 24 in the hub section 4. The disk 22 contacts with the inner end of the axle box 14, and due thereto functions in conjunction with the packing 21 to hold the hub against outward movement with respect to the axle box.

From the foregoing and accompanying drawing, it will be apparent that the hub may be readily secured to and removed from the axle spindle 1, that it is dust-proof and embodies a lubricator arranged wholly within the same, and that practically none of the lubricant can escape from it. It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. In combination, an axle spindle, a hollow axle box fixed to the spindle and provided with a radial opening, a hub section mounted on the axle box, a hub section mounted on the axle spindle, packing mounted within said second hub section and contacting with the axle spindle, a disk mounted in said second hub section and contacting with the axle box, and means securing the hub sections together.

2. In combination, an axle spindle, a hollow axle box fixed to the spindle and provided with a radial opening, a hub section mounted on the axle box, a hub band mounted on the axle box, a hub section mounted on the spindle, means securing the hub sections and hub band together, packing mounted in said second hub section and contacting with the spindle, a disk mounted in said second hub section and contacting with the axle box and hub band, and means securing the disk to said second hub section for rotation therewith.

3. In combination, an axle spindle, an axle box fixed to the outer portion of the spindle for rotation therewith, said axle box having a chamber therein to hold a lubricant, a head on the end of the spindle closing an end of the chamber, an outer hub section mounted on the axle box and having its outer end closed and contacting with the outer end of the axle box, an inner hub section mounted on the inner portion of the spindle and contacting with the inner end of the axle box, said inner hub section having a core larger in diameter than the axle box, packing contained in said bore, a disk adapted to rotate with the hub section and adjustable on the spindle, said disk engaging an end of the axle box, and means securing the hub sections together.

In testimony whereof I affix my signature.

HENRY W. ROBBINS.